(12) United States Patent
Niu et al.

(10) Patent No.: US 11,303,878 B2
(45) Date of Patent: Apr. 12, 2022

(54) THREE-DIMENSIONAL DISPLAY PANEL, DISPLAY METHOD THEREOF, AND DISPLAY DEVICE

(71) Applicant: BOE TECHNOLOGY GROUP CO., LTD., Beijing (CN)

(72) Inventors: Xiaochen Niu, Beijing (CN); Chenyu Chen, Beijing (CN); Xue Dong, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 720 days.

(21) Appl. No.: 16/090,610

(22) PCT Filed: Feb. 2, 2018

(86) PCT No.: PCT/CN2018/075067
§ 371 (c)(1),
(2) Date: Oct. 2, 2018

(87) PCT Pub. No.: WO2019/000948
PCT Pub. Date: Jan. 3, 2019

(65) Prior Publication Data
US 2021/0227196 A1 Jul. 22, 2021

(30) Foreign Application Priority Data
Jun. 27, 2017 (CN) .......................... 201710501909.9

(51) Int. Cl.
H04N 13/00 (2018.01)
H04N 13/305 (2018.01)
(Continued)

(52) U.S. Cl.
CPC ........... *H04N 13/305* (2018.05); *G02B 30/27* (2020.01); *G02B 3/0056* (2013.01); *H04J 2203/0094* (2013.01)

(58) Field of Classification Search
CPC combination set(s) only.
See application file for complete search history.

(56) References Cited

U.S. PATENT DOCUMENTS

2002/0044349 A1* 4/2002 Shinoura ................ G03B 21/56
359/443
2007/0030543 A1* 2/2007 Javidi .................... G02B 30/27
359/9
(Continued)

FOREIGN PATENT DOCUMENTS

CN  101576662 A  11/2009
CN  101923232 A  12/2010
(Continued)

OTHER PUBLICATIONS

Huang et al."The Light Field Stereoscope: Immersive Computer Graphics via Factored Near-Eye Light Field Displays with Focus Cues", ACM SIGGRAPH (Transactions on Graphics 33, 5), 2015.*
(Continued)

*Primary Examiner* — Frank F Huang
(74) *Attorney, Agent, or Firm* — Calfee, Halter & Griswold LLP

(57) ABSTRACT

The present disclosure provides a three-dimensional display panel, a display method thereof, and a display device. The three-dimensional display panel includes: a first display panel, a second display panel, and a microlens array stacked sequentially; the first display panel and the second display panel have a same light exit direction, and the microlens array is located in the light exit direction; a distance between the first display panel and the microlens array is greater than a focal length of the microlens array; a distance between the
(Continued)

second display panel and the microlens array is less than the focal length of the microlens array; and the second display panel is a transmissive display panel.

18 Claims, 7 Drawing Sheets

(51) Int. Cl.
*G02B 30/27* (2020.01)
*G02B 3/00* (2006.01)

(56) References Cited

U.S. PATENT DOCUMENTS

| | | | | |
|---|---|---|---|---|
| 2008/0239065 | A1* | 10/2008 | Momonoi | H04N 13/254 348/49 |
| 2014/0168070 | A1 | 6/2014 | Jeong et al. | |
| 2016/0105668 | A1 | 4/2016 | Fang | |
| 2017/0171533 | A1* | 6/2017 | Benitez | G02B 30/27 |
| 2017/0269353 | A1* | 9/2017 | Xu | G02B 30/27 |

FOREIGN PATENT DOCUMENTS

| | | |
|---|---|---|
| CN | 102540485 A | 7/2012 |
| CN | 102692805 A | 9/2012 |
| CN | 103870773 A | 6/2014 |
| CN | 104168472 A | 11/2014 |
| CN | 104297930 A | 1/2015 |
| CN | 104883555 A | 9/2015 |
| CN | 107102446 A | 8/2017 |
| KR | 20070104213 A | 10/2007 |
| KR | 20120095217 A | 8/2012 |
| WO | 2016105521 A1 | 6/2016 |

OTHER PUBLICATIONS

Jang et al. Three-dimensional integral imaging of micro-objects, Optics Letters / vol. 29, No. 11 / Jun. 1, 2004.*
Search Report and Written Opinion for International Application No. PCT/CN2018/075067 dated Apr. 28, 2018.
First Office Action for Chinese Patent Application No. 201710501909.9 dated Jan. 11, 2019.

* cited by examiner

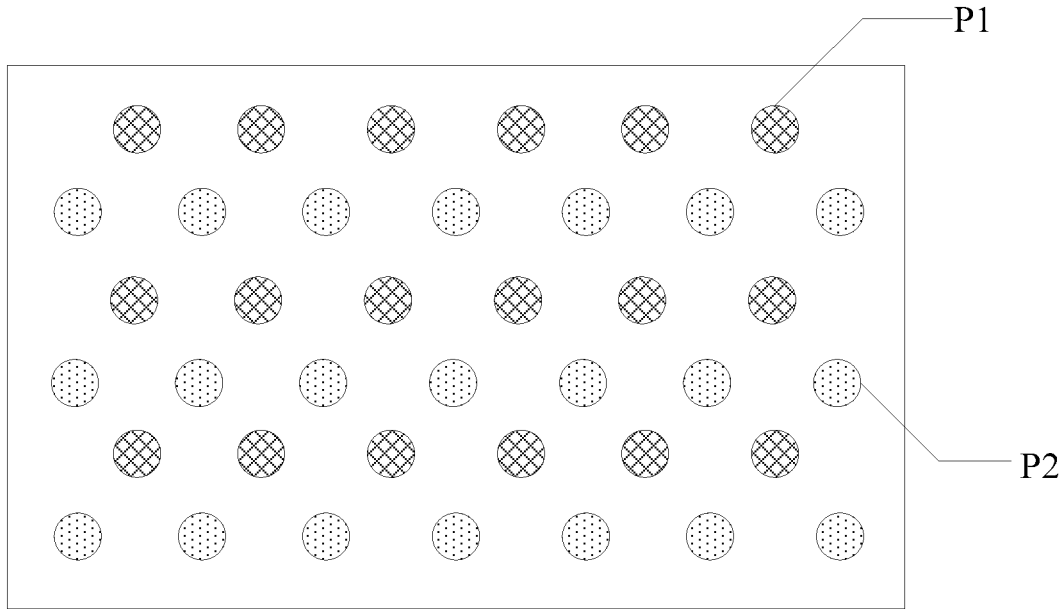

Fig. 7 controlling the first display panel to perform image display, then forming a real image by the microlens array after a display image of the first display panel passes through the second display panel controlling the second display panel to perform image display, then forming a virtual image of a display image of the second display panel by the microlens array; superimposing the real image on the virtual image to realize three-dimensional display

Fig. 8

THREE-DIMENSIONAL DISPLAY PANEL, DISPLAY METHOD THEREOF, AND DISPLAY DEVICE

RELATED APPLICATIONS

The present application is the U.S. national phase entry of the international application PCT/CN2018/075067, with an international filing date of Feb. 2, 2018, which claims the benefit of Chinese Patent Application No. 201710501909.9, filed on Jun. 27, 2017, the entire disclosures of which are incorporated herein by reference.

TECHNICAL FIELD

The present disclosure relates to the field of display technology, in particular to a three-dimensional display panel, a display method thereof, and a display device.

BACKGROUND

With the development of three-dimensional display, naked-eye three-dimensional display has become a research hotspot in the field of display. Compared with the three-dimensional display based on the principle of binocular parallax which is popular currently, the integrated imaging three-dimensional display does not need to wear stereo glasses and other auxiliary devices, and is a naked-eye three-dimensional display technology. When viewing an image displayed by the integrated imaging three-dimensional display, the viewer can focus and zoom like viewing a real three-dimensional scene, so the integrated imaging three-dimensional display has a significant advantage of no visual fatigue. In addition, the integrated imaging technology has advantages of requiring no coherent light source and darkroom, simple structure and full color display, and has become one of the leading three-dimensional display technologies.

Integrated imaging records and reproduces real three-dimensional scenes through a two-dimensional microlens array. During the recording process, the three-dimensional scene is imaged through each lens in the array to obtain a series of two-dimensional images; in the reproducing process, the two-dimensional images are displayed on the display through the same microlens array. Based on the principle of reversibility of light path, the reproduction of the three-dimensional scene can be realized.

Conventional integrated imaging technology still has problems such as low resolution and small depth range of three-dimensional image. The current integrated imaging technology has the problem of decreased depth of image while the resolution is increased, and the image resolution is inevitably decreased when the depth of image is increased. It seems impossible to increase the resolution and depth of field at the same time. Therefore, how to improve the image resolution and increase the depth of image for the three-dimensional image is an urgent problem to be solved.

SUMMARY

Embodiments of the present disclosure provide a three-dimensional display panel, a display method thereof, and a display device.

In a first aspect, an embodiment of the present disclosure provides a three-dimensional display panel. The three-dimensional display panel includes: a first display panel, a second display panel, and a microlens array stacked sequentially; the first display panel and the second display panel have a same light exit direction, and the microlens array is located in the light exit direction; a distance between the first display panel and the microlens array is greater than a focal length of the microlens array; a distance between the second display panel and the microlens array is less than the focal length of the microlens array; and the second display panel is a transmissive display panel.

In some possible implementations, in the three-dimensional display panel provided by an embodiment of the present disclosure, the second display panel is a liquid crystal display panel or a transparent organic light emitting diode display panel.

In some possible implementations, in the three-dimensional display panel provided by an embodiment of the present disclosure, the first display panel is a liquid crystal display panel or an organic light emitting diode display panel.

In some possible implementations, in the three-dimensional display panel provided by an embodiment of the present disclosure, the display images of both the first display panel and the second display panel include a plurality of unit images, and each unit image is displayed by a plurality of pixels arranged in an array.

In some possible implementations, in the three-dimensional display panel provided by an embodiment of the present disclosure, one microlens corresponds to at least one unit image of the first display panel; one microlens corresponds to at least one unit image of the second display panel.

In a possible implementation, in the three-dimensional display panel provided by an embodiment of the present disclosure, each microlens and each unit image of the first display panel are in one-to-one correspondence; each microlens and each unit image of the second display panel are in one-to-one correspondence.

In some possible implementations, in the three-dimensional display panel provided by an embodiment of the present disclosure, during three-dimensional display, the microlens array is configured to form a virtual image of the display image of the second display panel, and form a real image of the display image of the first display panel passing through the second display panel; the real image is superimposed on the virtual image to realize three-dimensional display.

In a second aspect, an embodiment of the present disclosure provides a display device. The display device includes the three-dimensional display panel according to any one of the above embodiments.

In a third aspect, an embodiment of the present disclosure provides a display method of a three-dimensional display panel according to any one of the above embodiments.

The method includes the following steps: controlling the first display panel to perform image display, then forming a real image by the microlens array after a display image of the first display panel passes through the second display panel; and controlling the second display panel to perform image display, then forming a virtual image of a display image of the second display panel by the microlens array; superimposing the real image on the virtual image to realize three-dimensional display.

In some possible implementations, in the display method provided by an embodiment of the present disclosure, the first display panel and the second display panel alternately perform image display in order.

In some possible implementations, in the display method provided by an embodiment of the present disclosure, the second display panel is a liquid crystal display panel; when the first display panel performs image display, the second display panel is in a light transmitting state; when the second display panel performs image display, the first display panel serves as a backlight of the second display panel.

In some possible implementations, in the display method provided by an embodiment of the present disclosure, when the first display panel performs image display, the method further includes:

adjusting a display color of each pixel of the first display panel based on a color of a color film of the second display panel corresponding to each pixel of the first display panel and a color of a display image that is required to be displayed by the first display panel, so that a color of the display image of the first display panel after passing through the second display panel is in line with demand.

In some possible implementations, in the display method provided by an embodiment of the present disclosure, the display images of both the first display panel and the second display panel include a plurality of unit images, and each unit image is displayed by a plurality of pixels arranged in an array; the unit image displayed by the first display panel is a foreground image; and the unit image displayed by the second display panel is a background image.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings can be obtained according to these drawings under the premise of not paying out creative work.

FIG. 7 is a schematic diagram of an imaging effect provided by an embodiment of the present disclosure;

FIG. 8 is a flow chart of a display method of a three-dimensional display panel provided by an embodiment of the present disclosure.

DETAILED DESCRIPTION OF THE DISCLOSURE

In the following, the technical solutions in the embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

In view of the problems existing in the prior art, embodiments of the present disclosure provide a three-dimensional display panel, a display method thereof, and a display device for improving the resolution of a three-dimensional image and increasing the depth range of the three-dimensional image.

The three-dimensional display panel, the display method thereof and the display device provided by the specific embodiments of the present disclosure are described in detail below with reference to the drawings.

Figure 1:
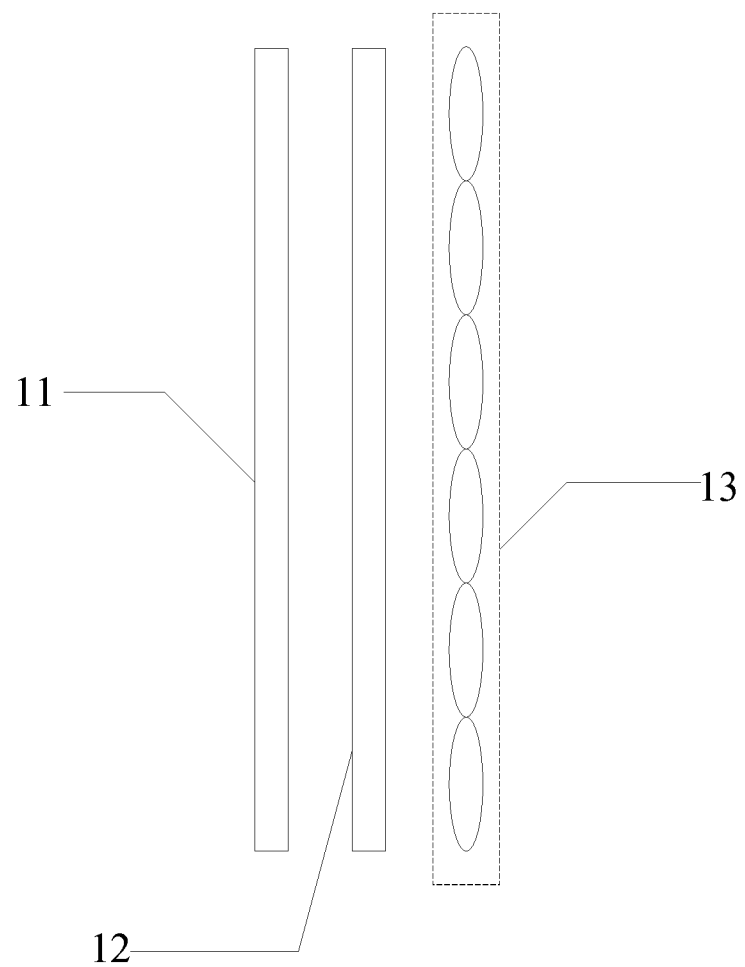
FIG. 1 is a structural schematic diagram of a three-dimensional display panel provided by an embodiment of the present disclosure.

As shown in FIG. 1, a three-dimensional display panel according to an embodiment of the present disclosure includes: a first display panel 11, a second display panel 12, and a microlens array 13 which are sequentially stacked. The first display panel 11 and the second display panel 12 have a same light exit direction, and the microlens array 13 is located in the light exit direction. A distance between the first display panel 11 and the microlens array 13 is greater than a focal length of the microlens array 13; a distance between the second display panel 12 and the microlens array 13 is less than the focal length of the microlens array 13. The second display panel 12 is a transmissive display panel.

In a specific implementation, a viewer can view a three-dimensional image at a side of the microlens array 13 facing away from the second display panel 12. A display image of the first display panel 11 is incident on the microlens array 13 after passing through the second display panel 12, and a real image is formed at the side of the microlens array 13 facing away from the second display panel 12; a display image of the second display panel 12 can be directly incident on the microlens array 13, a virtual image is formed at a side of the first display panel 11 facing away from the second display panel 12, and the viewer can view the three-dimensional image by visually superimposing the real image and the virtual image. In this case, the depth range in which a clear three-dimensional image can be viewed is between the real image and the virtual image, which greatly increases the depth range with respect to the prior art. After the relative positions between the first display panel 11, the second display panel 12 and the microlens array 13 are adjusted, the pixel of the real image and the pixel of the virtual image are not overlapped with each other, thereby improving the resolution of the three-dimensional image and improving the viewing experience.

Specifically, prior to performing the integrated imaging three-dimensional display, the microlens array records information of different object points of the three-dimensional scene in different directions. During three-dimensional display, the embodiments of the present disclosure include the following two cases.

Figure 2A:
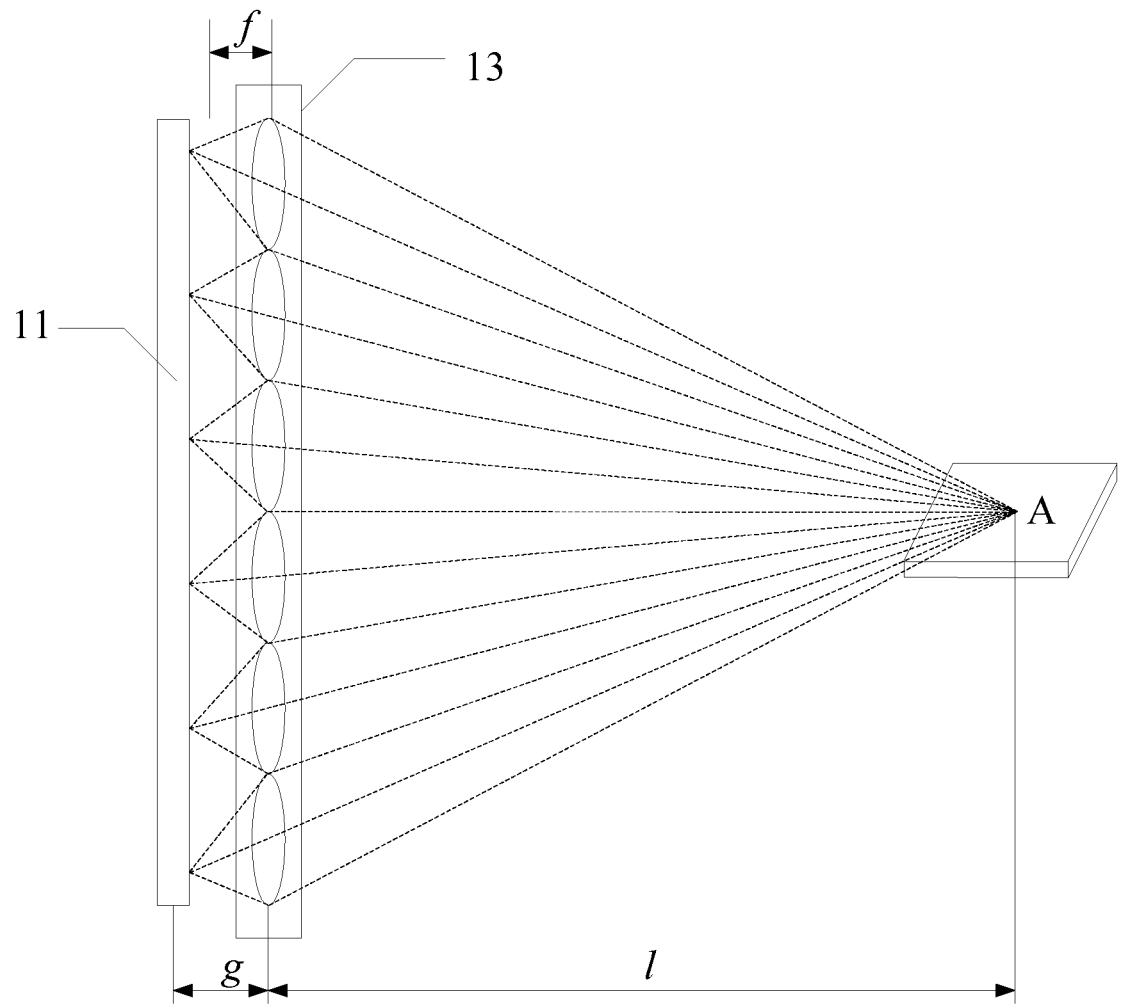
FIG. 2A is a first imaging schematic diagram of a display panel provided by an embodiment of the present disclosure.

As shown in FIG. 2A, when the distance g between the display panel and the microlens array is greater than the focal length f of the microlens array (i.e., g>f), the display panel corresponds to the first display panel 11. After the display image of the first display panel 11 passes through the microlens array 13, a real image is formed at the side of the microlens array 13 facing away from the first display panel 11. For example, the object points in the first display panel 11 shown in FIG. 2A form a three-dimensional image point A after light emitted from the object points passes through the microlens array 13; and the image composed of all the three-dimensional pixels can realize the stereoscopic effect in front of the screen.

Figure 2B:
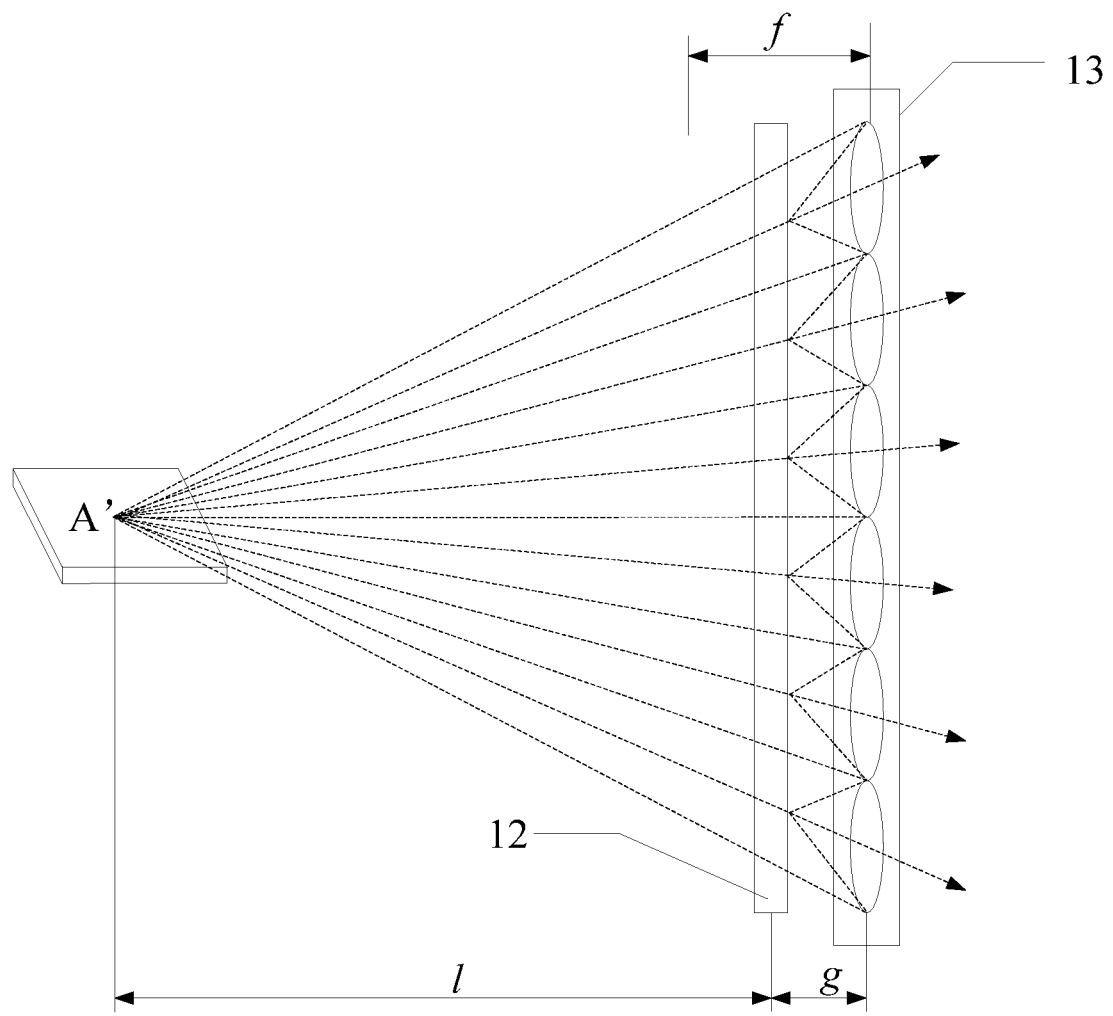
FIG. 2B is a second imaging schematic diagram of a display panel provided by an embodiment of the present disclosure.

As shown in FIG. 2B, when the distance g between the display panel and the microlens array is less than the focal length f of the microlens array (i.e., g<f), the display panel corresponds to the second display panel 12. After the display image of the second display panel 12 passes through the microlens array 13, a virtual image is formed at the side of the microlens array 13 facing away from the second display panel 12. For example, the object points in the second display panel 12 shown in FIG. 2B form a three-dimensional image points A' after light emitted from the object points passes through the microlens array 13, and the images composed of all the three-dimensional pixels can realize the stereoscopic effect behind the screen.

The light emitted by the object points at different positions in the images displayed by the first display panel and the second display panel is concentrated in the image space and integrated into a three-dimensional image point. The plane in which the three-dimensional image point is located is called an integration plane. The image plane of the display panel imaged by the microlens array is called the central depth plane (CDP). The resolution of the image points on the central depth plane is the highest. In this case, the distance l between the CDP and the microlens array can be determined by the Gaussian imaging formula:

$$\frac{1}{f} = \frac{1}{g} + \frac{1}{l};$$

in the imaging scene as shown in FIG. 2B, the image distance l<0.

Figure 3:
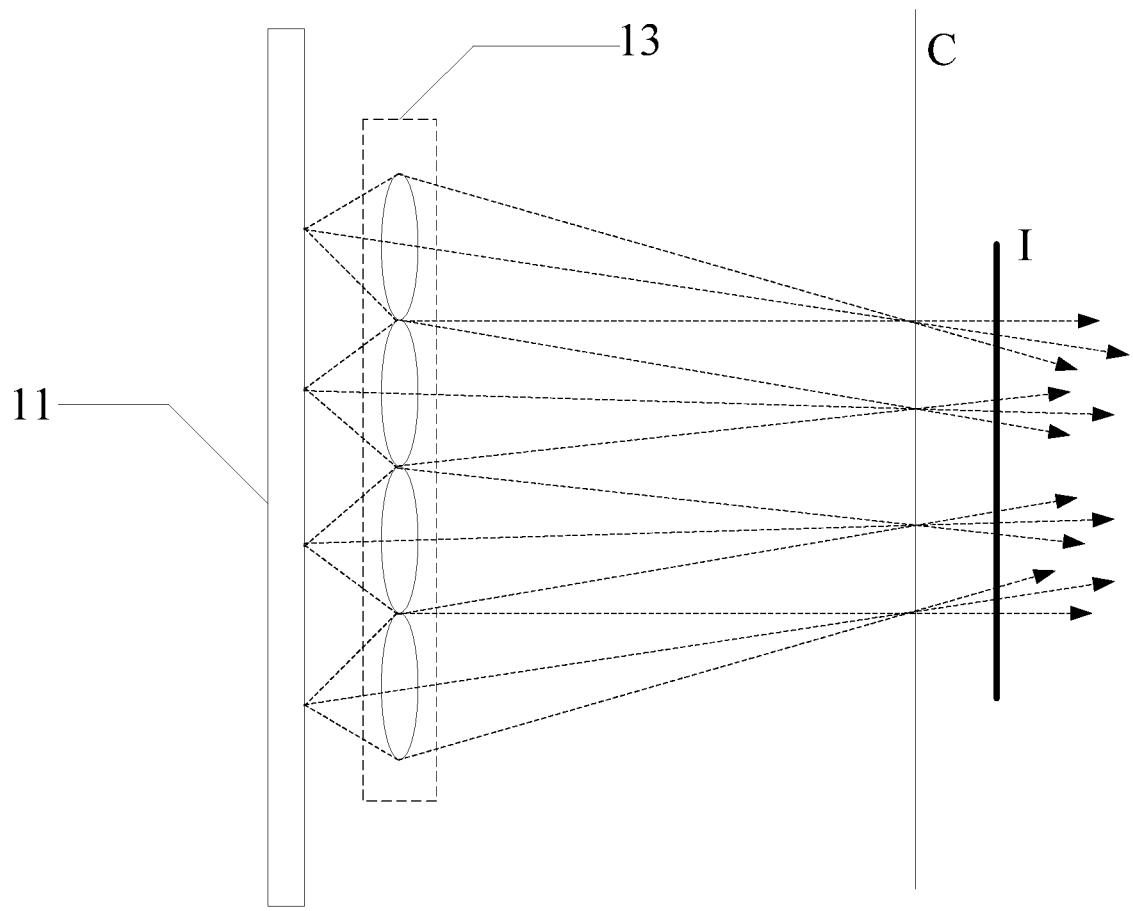
FIG. 3 is a schematic diagram of an imaging principle provided by an embodiment of the present disclosure.

For example, the three-dimensional image of the first display panel 11 forms a real image after passing through the microlens array 13. As shown in FIG. 3, the central depth plane is denoted by C, and the integration plane is denoted by I. The display image in the first display panel 11 forms a real image at the other side of the microlens array after passing through the microlens array 13. Since there are different integration planes I in the three-dimensional image space, when the distance between the integration plane I and the central depth plane C exceeds a certain range, the three-dimensional image points are greatly diffused, then the three-dimensional image becomes blurred. Therefore, the integration plane cannot be too far away from the central depth plane. The three-dimensional image is thus limited to a small range at both sides of the central depth plane, resulting in a small depth range of the three-dimensional image.

Figure 4:
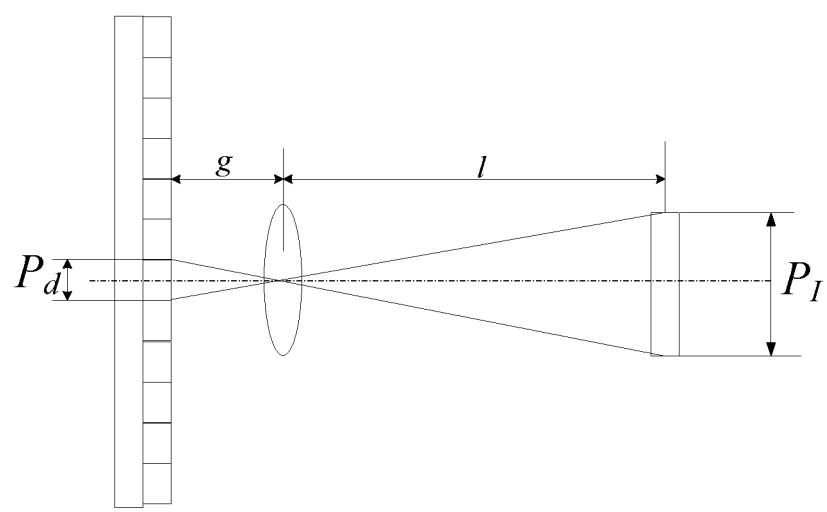
FIG. 4 is a schematic diagram of an imaging relationship provided by an embodiment of the present disclosure.

Further, as shown in FIG. 4, after light emitted from a pixel point $P_d$ having a certain size on the display panel passes through the microlens array 13, a pixel size $P_I$ of a three-dimensional image is formed on the central depth plane C. According to the principle of paraxial imaging, the following relationship can be obtained:

$$\frac{P_d}{P_I} = \frac{g}{l}.$$

The image resolution and three-dimensional imaging depth of three-dimensional imaging are important parameters of the imaging effect. The image resolution refers to the resolution of reproducing the three-dimensional imaging, which is determined by the resolution of the display panel, the distance between the display panel and the microlens array, and the focal length of the microlens. The image resolution $R_I$ is numerically equal to the reciprocal of the pixel size $P_I$ of the three-dimensional image on the central depth plane, i.e.: $R_I = 1/P_I$.

With the above formula, the image resolution on the central depth plane satisfies the following relationship:

$$R_I = \frac{1}{P_I} = \frac{g}{lP_d} = \frac{gR_d}{l}.$$

Figure 5:
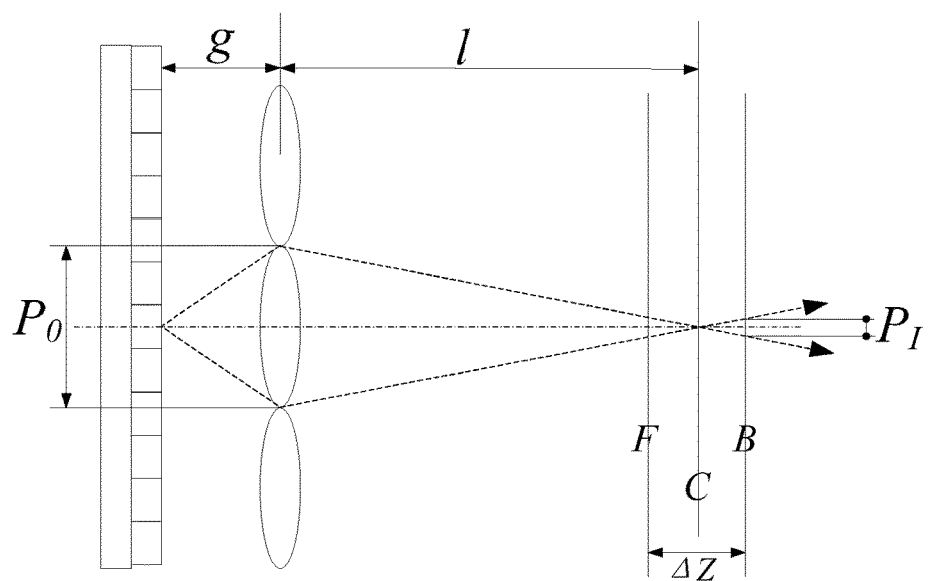
FIG. 5 is a schematic diagram of an imaging depth of field provided by an embodiment of the present disclosure.

Further, when the integration plane I is far away from the central depth plane C, the three-dimensional image point will diffuse into a defocused spot, and the defocused spots generated by the adjacent three-dimensional image points will overlap. As shown in FIG. 5, when the overlap amount is about the pixel size $P_I$ of the three-dimensional image on the depth plane C, the distance between the integration plane and the central depth plane can be regarded as the depth of the three-dimensional image that can be clearly viewed, where the integration plane is called the edge depth plane. As shown in FIG. 5, the edge depth plane can be a front edge depth plane F or a back edge depth plane B at two sides of the central depth plane C. Thus, from the imaging relationship shown in FIG. 5, the depth ΔZ of the three-dimensional image satisfies the following relationship:

$$\frac{\Delta Z/2}{l} = \frac{P_I}{P_0}. \quad P_0$$

represents the interval of the microlenses; when the microlenses are closely arranged, $P_0$ can also represent the aperture of the lens.

In the focus mode, the pixel size $P_I$ of the three-dimensional image is equal to the size of the microlens aperture, so the image resolution can also be expressed as:

$$R_I = \frac{1}{P_0};$$

with the above formula, the depth ΔZ of the three-dimensional image can be expressed as:

$$\Delta Z = 2\frac{l}{P_0}P_I = 2\frac{g}{P_d}P_0.$$

This indicates that the resolution and depth of the three-dimensional image have a mutually constrained relationship after the resolution Rd of the display panel is determined. When the aperture size of the microlens is increased, the resolution of the three-dimensional image can be reduced and the depth of the three-dimensional image can be increased. When the aperture size of the microlens is reduced, the resolution of the three-dimensional image can be improved, and the depth of the three-dimensional image can be reduced.

Figure 6:
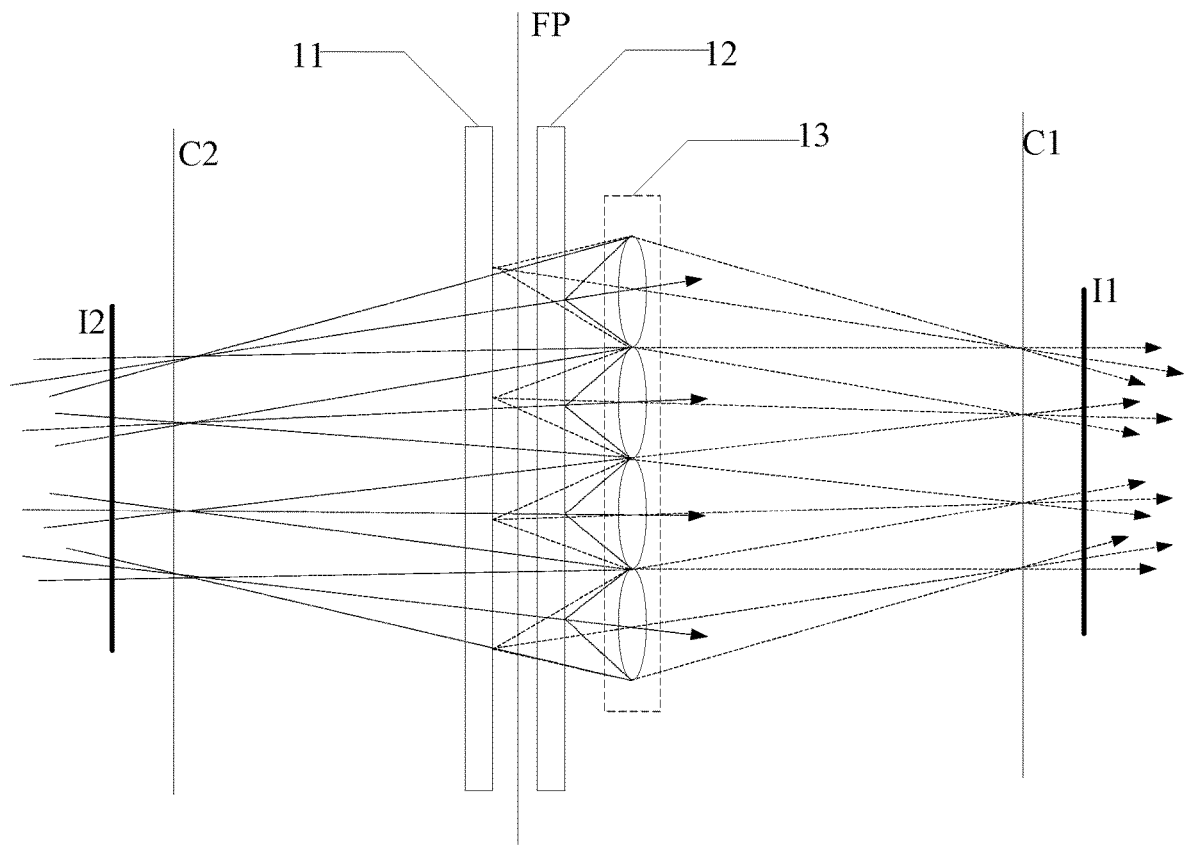
FIG. 6 is a third imaging schematic diagram of a display panel provided by an embodiment of the present disclosure.

In view of this, as shown in FIG. 6, the display panel provided by the embodiments of the present disclosure includes a first display panel 11 and a second display panel 12, and the images displayed by the two display panels form a complete three-dimensional image. Therefore, the foreground and background images can be separately recorded in the image recording stage, and two display panels are used in the reproducing stage to respectively display the recorded foreground and background images. For the display panel provided by the embodiments of the present disclosure, since the viewer is usually located at the side of the microlens array 13 facing away from the second display panel 12 to view the three-dimensional image, the first display panel which forms a real image at the side of the microlens array 13 facing away from the second display panel 12 can be controlled to display the recorded foreground image, and the second display panel 12 which forms a virtual image on the side of the first display panel 11 facing away from the second display panel 12 can be controlled to display the recorded background image, thus the three-dimensional images formed by superimposing the foreground and background can be viewed in the viewing angle.

In practical applications, as shown in FIG. 6, the first display panel 11 and the second display panel 12 are respectively located at both sides of the focal plane FP of the microlens array 13. When the first display panel 11 is located between the focal length and two times of the focal length of the microlens array 13, the display image thereof can form an enlarged real image. When the first display panel 11 is located outside two times of the focal length of the microlens array 13, the display image thereof can form a reduced real image. Therefore, the position of the first display panel 11 can be set according to the required effect of enlarging or reducing the foreground of the three-dimensional image. During three-dimensional imaging by using the display panel provided by the embodiments of the present disclosure, the depth of the three-dimensional image is no longer the depth near the central depth plane corresponding to the single display panel. A clear three-dimensional image can be seen in the vicinity of the first central depth plane C1 corresponding to the first display panel 11 and the second central depth plane C2 corresponding to the second display panel 12. As shown in FIG. 6, on the integrated plane I1, a clear three-dimensional image in the depth range corresponding to the first central depth plane C1 may be viewed; on the integrated plane I2, a clear three-dimensional image in the depth range corresponding to the second central depth plane C2 may be viewed. The three-dimensional image can thus be viewed in the depth range between I1 and I2, so the depth range of the three-dimensional image is larger than the conventional three-dimensional display using a single display panel.

Moreover, the resolution of the three-dimensional image as described above is determined by the resolution of the display panel, the distance between the display panel and the microlens array, and the focal length of the microlens. In practical applications, the resolution of the first display panel 11 and the second display panel 12, the object distance between the first display panel 11 and the microlens array 13, and the object distance between the second display panel 12 and the microlens array 13 can be adjusted, so that the three-dimensional image can be rendered with the effect shown in FIG. 7. P1 represents images of the pixels of the first display panel 11, and P2 represents images of the pixels of the second display panel 12. Compared with imaging by a single display panel in the prior art, the images of the pixels in an additional display panel are added to the three-dimensional image, so the resolution is greatly improved, and the viewing experience is improved.

In practical applications, the resolutions of the first display panel 11 and the second display panel 12 may be the same or different, and the pixel arrangement of the two display panels may be aligned with each other or may be offset from each other. The first display panel 11 can be a liquid crystal display panel or an organic light emitting diode display panel. The second display panel 12 needs to transmit the display image of the first display panel 11 to the microlens array. Therefore, the second display panel 12 is a transmissive display panel. For example, the second display panel 12 can be a liquid crystal display panel or a transparent organic light emitting diode display panel.

In a specific implementation, in the display panel provided by the embodiments of the present disclosure, the display images of the first display panel 11 and the second display panel 12 include a plurality of unit images, and the unit images are a series of mutually independent two-dimensional images obtained by imaging the three-dimensional scene through the microlens array. The unit images may be different, and they are images containing three-dimensional scene information recorded by microlenses from different viewing angles. Each unit image is displayed by a plurality of pixels arranged in an array in the display panel during the three-dimensional scene reproducing stage.

In practical applications, one microlens may correspond to a unit image of at least one first display panel; one microlens may correspond to a unit image of at least one second display panel. As an optional implementation, each microlens and each unit image of the first display panel are in one-to-one correspondence; each microlens and each unit image of the second display panel are in one-to-one correspondence. In this case, the size of a unit image is equal to the size of the aperture of a microlens. In a specific implementation, the correspondence between the microlens and the unit image can be determined according to the requirements of the specific product, which is not limited herein.

In a specific implementation, when the three-dimensional display is performed by using the display panel provided by the embodiments of the present disclosure, as shown in FIG. 6, the microlens array 13 is used to form a virtual image of the display image of the second display panel 12, and form a real image of the display image of the first display panel 11 transmitted by the second display panel 12. The real image is superimposed on the virtual image to realize three-dimensional display.

Based on the same concept, a specific embodiment of the present disclosure further provides a display device. The display device includes the three-dimensional display panel provided by any embodiment of the present disclosure, and has features of high resolution and large depth of field during three-dimensional display.

In addition, a specific embodiment of the present disclosure further provides a display method of a three-dimensional display panel according to any one of the above embodiments. Specifically, as shown in FIG. 8, the method includes the following steps: controlling the first display panel to perform image display, then forming a real image by the microlens array 13 after a display image of the first display panel passes through the second display panel; and controlling the second display panel to perform image display, then forming a virtual image of a display image of the second display panel by the microlens array 13; superimposing the real image on the virtual image to realize three-dimensional display.

The real image corresponding to the first display panel and the virtual image corresponding to the second display panel are respectively located at two sides of the microlens array, thereby greatly increasing the depth range of the three-dimensional image; the resulted three-dimensional image is formed by imaging the pixels of the two display panels. Therefore, the resolution of the three-dimensional image is also improved.

Further, in order to avoid crosstalk between the display images of the two display panels, the first display panel 11 and the second display panel 12 can be controlled to alternately perform image display in order. For example, in a display frame, the first display panel 11 can be controlled to perform image display first, the second display panel 12 is in a light transmitting state; then the second display panel 12 is controlled to perform image display, and the first display panel 11 no longer displays image. When the switching speed of image display for the first display panel 11 and the second display panel 12 is controlled to be greater than the frequency recognizable by the human eye, a high-resolution three-dimensional image can be seen due to the visual persistence effect of the human eye.

Taking the second display panel 12 being a liquid crystal display panel as an example, when the first display panel is controlled to perform image display, the liquid crystal display panel can be in a light transmitting state; when switching to a liquid crystal panel for image display, the first display panel can serve as a backlight of the liquid crystal display panel.

When the first display panel is also a liquid crystal display panel, it is referred to as a first liquid crystal display panel, and the liquid crystal display panel of the second display panel is referred to as a second liquid crystal display panel. The first liquid crystal display panel has a backlight, and the second liquid crystal display panel does not have a backlight. When the second liquid crystal display panel performs image display, the first liquid crystal display panel can serve as a backlight of the second liquid crystal display panel. Optionally, when the second liquid crystal display panel performs image display, the first liquid crystal display panel can be set to a normally white mode to provide a white backlight for the second liquid crystal display panel.

When the second display panel is a liquid crystal display panel, since the liquid crystal display panel has a color film, when the display image of the first display panel passes through the color film of the liquid crystal display panel, the display image may have a crosstalk in color. Therefore, in the display method provided by the embodiments of the present disclosure, when the first display panel performs image display, the method further includes the following steps: adjusting a display color of each pixel of the first display panel based on a color of a color film of the second display panel corresponding to each pixel of the first display panel and a color of a display image that is required to be displayed by the first display panel, so that a color of the display image of the first display panel after passing through the second display panel is in line with demand.

Before the first display panel performs image display, the color of each pixel in the first display panel is compensated in advance according to the normal color of the desired display image, and then the image is transmitted by the second display panel to perform image display, thereby solving the problem of color crosstalk to the displayed image of the first display panel caused by the color film.

In a specific implementation, as described above, the display images of both the first display panel and the second display panel include a plurality of unit images, and each unit image is displayed by a plurality of pixels arranged in the array; the unit image displayed by the first display panel is a foreground image; the unit image displayed by the second display panel is a background image.

Figure 9:
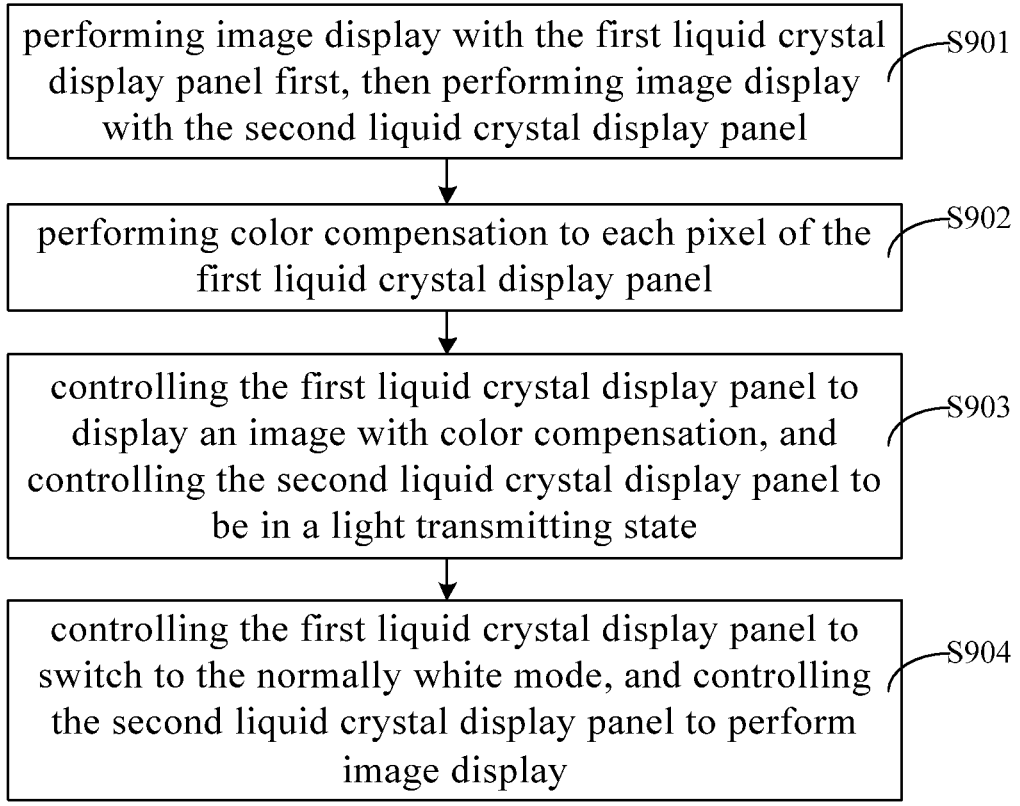
FIG. 9 is a flow chart of a color compensation step of a display method of a three-dimensional display panel provided by an embodiment of the present disclosure.

The display method provided by the embodiments of the present disclosure is exemplified as an example in which the first display panel and the second display panel are both liquid crystal display panels. When the first display panel and the second display panel are both liquid crystal display panels, as shown in FIG. 9, the display method of the three-dimensional display panel may further include the following steps.

S901: performing image display with the first liquid crystal display panel first, then performing image display with the second liquid crystal display panel.

S902: performing color compensation to each pixel of the first liquid crystal display panel.

S903: controlling the first liquid crystal display panel to display an image with color compensation, and controlling the second liquid crystal display panel to be in a light transmitting state.

S904: controlling the first liquid crystal display panel to switch to the normally white mode, and controlling the second liquid crystal display panel to perform image display.

With the visual persistence effect of the human eye, after the first liquid crystal display panel and the second liquid crystal display panel are switched to perform image display by the above steps, a three-dimensional image with a high resolution and a large depth of field can be viewed.

The present disclosure provides a three-dimensional display panel, a display method thereof, and a display device. The three-dimensional display panel includes a first display panel, a second display panel at the light exit side of the first display panel, and a microlens array at the light exit side of the second display panel. The distance between the first display panel and the microlens array is greater than the focal length of the microlens array; the distance between the second display panel and the microlens array is smaller than the focal length of the microlens array. During three-dimensional display, the microlens array is configured to form a virtual image of the display image of the second display panel, and form a real image of the display image of the first display panel passing through the second display panel; the real image is superimposed on the virtual image to realize three-dimensional display. The real image corresponding to the first display panel and the virtual image corresponding to the second display panel are respectively located at two sides of the microlens array, thereby greatly increasing the depth range of the three-dimensional image; the resulted three-dimensional image is formed by imaging the pixels of the two display panels. Therefore, the resolution of the three-dimensional image is also improved.

Although alternative embodiments of the present disclosure have been described, those skilled in the art can make additional changes and modifications to the embodiments once they understand the basic inventive concept. Therefore, the appended claims are intended to be construed as including all alternative embodiments and changes and modifications that fall in the scope the present disclosure.

Those skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

What is claimed is:

1. A three-dimensional display panel, comprising: a first display panel, a second display panel, and a microlens array stacked sequentially;

wherein the first display panel and the second display panel have a same light exit direction, and the microlens array is located in a light exit direction; a distance between the first display panel and the microlens array is greater than a focal length of the microlens array; a distance between the second display panel and the microlens array is less than the focal length of the microlens array; the second display panel is a transmissive display panel;

wherein during three-dimensional display, the microlens array is configured to form a virtual image of a display image of the second display panel, and form a real image of a display image of the first display panel passing through the second display panel; the real image is superimposed on the virtual image to realize three-dimensional display; a pixel arrangement of the first display panel and a pixel arrangement of the second display panel are offset from each other.

2. The three-dimensional display panel according to claim 1, wherein the second display panel is a liquid crystal display panel or a transparent organic light emitting diode display panel.

3. The display panel according to claim 1, wherein the first display panel is a liquid crystal display panel or an organic light emitting diode display panel.

4. The three-dimensional display panel according to claim 1, wherein display images of both the first display panel and the second display panel comprise a plurality of unit images, and each unit image is displayed by a plurality of pixels arranged in an array.

5. The three-dimensional display panel according to claim 4, wherein one microlens corresponds to at least one unit image of the first display panel, and one microlens corresponds to at least one unit image of the second display panel.

6. The three-dimensional display panel according to claim 5, wherein each microlens and each unit image of the first display panel are in one-to-one correspondence; each microlens and each unit image of the second display panel are in one-to-one correspondence.

7. A display device comprising the three-dimensional display panel according to claim 1.

8. A method for displaying an image on the three-dimensional display panel according to claim 1, comprising:
controlling the first display panel to perform image display, then forming a real image by the microlens array after a display image of the first display panel passes through the second display panel; and
controlling the second display panel to perform image display, then forming a virtual image of a display image of the second display panel by the microlens array;
superimposing the real image on the virtual image to realize three-dimensional display.

9. The method according to claim 8, wherein the first display panel and the second display panel alternately perform image display in order.

10. The method according to claim 9, wherein the second display panel is a liquid crystal display panel;
when the first display panel performs image display, the second display panel is in a light transmitting state;
when the second display panel performs image display, the first display panel serves as a backlight of the second display panel.

11. The method according to claim 10, wherein when the first display panel performs image display, the method further comprises:
adjusting a display color of each pixel of the first display panel based on a color of a color film of the second display panel corresponding to each pixel of the first display panel and a color of a display image that is required to be displayed by the first display panel, so that a color of the display image of the first display panel passing through the second display panel is in line with demand.

12. The method according to claim 8, wherein display images of both the first display panel and the second display panel comprise a plurality of unit images, and each unit image is displayed by a plurality of pixels arranged in an array;
a unit image displayed by the first display panel is a foreground image; and a unit image displayed by the second display panel is a background image.

13. The display device according to claim 7, wherein the second display panel is a liquid crystal display panel or a transparent organic light emitting diode display panel.

14. The display device according to claim 7, wherein the first display panel is a liquid crystal display panel or an organic light emitting diode display panel.

15. The display device according to claim 7, wherein display images of both the first display panel and the second display panel comprise a plurality of unit images, and each unit image is displayed by a plurality of pixels arranged in an array.

16. The display device according to claim 15, wherein one microlens corresponds to at least one unit image of the first display panel, and one microlens corresponds to at least one unit image of the second display panel.

17. The display device according to claim 16, wherein each microlens and each unit image of the first display panel are in one-to-one correspondence; each microlens and each unit image of the second display panel are in one-to-one correspondence.

18. The display method according to claim 12, wherein the first display panel and the second display panel alternately perform image display in order.

* * * * *